United States Patent
Ghanizadeh Khoub

(10) Patent No.: US 6,652,133 B2
(45) Date of Patent: Nov. 25, 2003

(54) KNEADING AND MIXING MACHINE

(75) Inventor: Mohammad Hashem Ghanizadeh Khoub, Osnabrueck (DE)

(73) Assignee: Diosna Dierks Soehne GmbH, Osnabrueck (DE)

(*) Notice: Subject to any disclaimer, the term of this patent is extended or adjusted under 35 U.S.C. 154(b) by 130 days.

(21) Appl. No.: 09/929,163

(22) Filed: Aug. 14, 2001

(65) Prior Publication Data

US 2002/0075751 A1 Jun. 20, 2002

(30) Foreign Application Priority Data

Sep. 19, 2000 (DE) .................................. 200 16 321 U

(51) Int. Cl.[7] .............................. B01F 9/10; B01F 15/02
(52) U.S. Cl. ........................ 366/95; 366/188; 366/189; 366/194
(58) Field of Search ................... 366/95, 187, 188, 366/189, 192, 184, 194

(56) References Cited

U.S. PATENT DOCUMENTS 3,635,147 A * 1/1972 Lee ............................. 366/192

FOREIGN PATENT DOCUMENTS

| DE | 24 21 720 | * 11/1975 |
| DE | 197 57 311 | * 7/1999 |
| FR | 2 442 151 | * 11/1979 |

* cited by examiner

Primary Examiner—Tony G. Soohoo
(74) Attorney, Agent, or Firm—Jordan and Hamburg LLP

(57) ABSTRACT

A kneading and mixing machine for dough, foodstuffs or the like includes a tub driven in rotation about a vertical axis of rotation, at least one rotatable tool entering into the latter and driven in rotation about an axis parallel to the tub's axis of rotation, and a closing body closing a coaxial bottom opening in the tub bottom which, in order to discharge a finished tub content, can be moved vertically by means of a lifting device to a mid-position and then can be swung by means of an actuator about a horizontal axis to a discharge position, wherein the closing body can be moved upward from its closing position to the mid-position and can then be swung within the tub to the discharge position.

7 Claims, 4 Drawing Sheets

KNEADING AND MIXING MACHINE

BACKGROUND OF THE INVENTION

Figure 1:
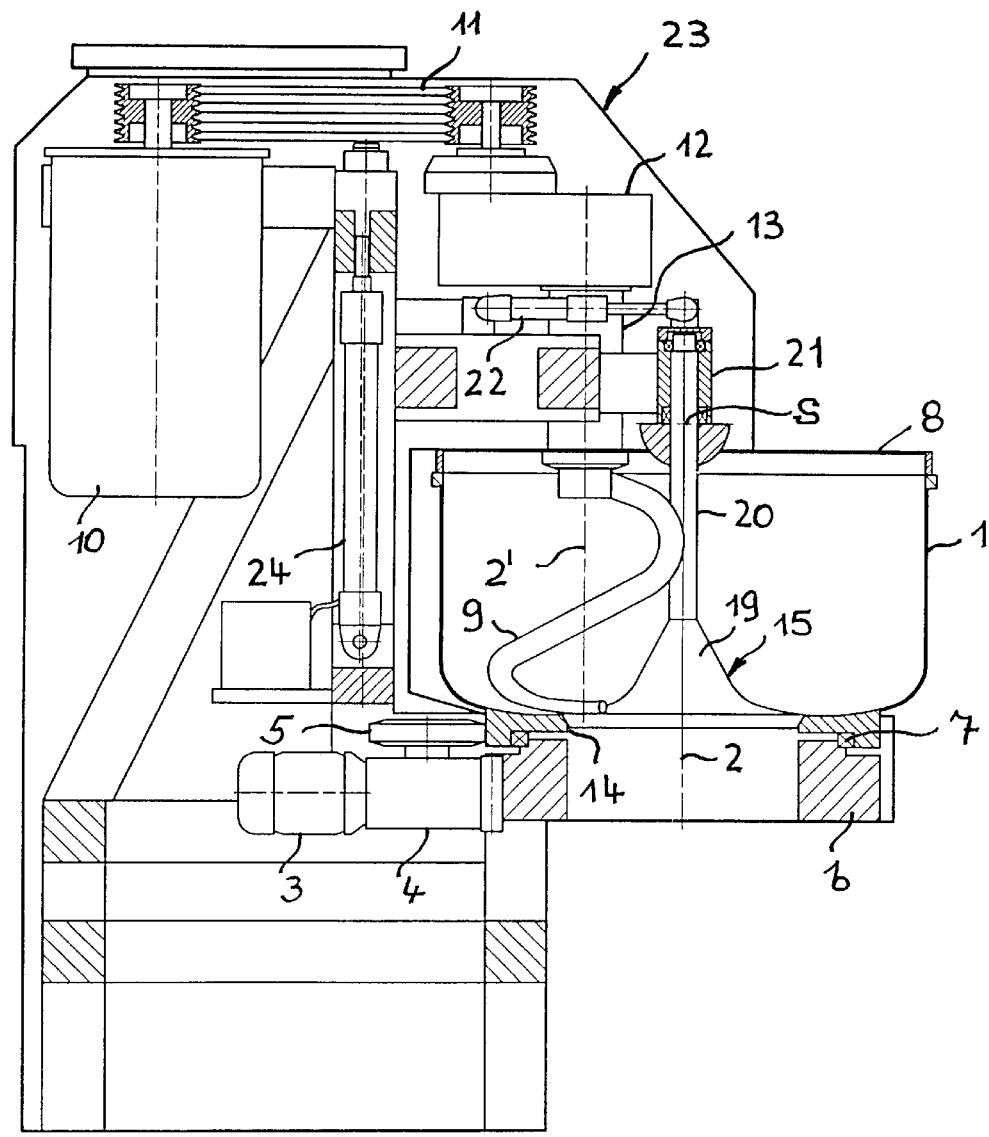

This invention relates to a kneading and mixing machine.

Setting out from a machine of this kind (DE 197 57 311 A1) the invention deals with the problem of improving the discharge of dough.

Since the closing body remains in the tub, the inventive machine promotes and accelerates the discharging of the contents of the tub after they are finished, while, by remaining in the tub chamber, the closing body is protected like all other parts coming in contact with the tub content both against contamination and against damage during the discharging process.

Further details and effects are found in the following description and the drawing, in which an embodiment of the object of the invention is shown in greater detail diagrammatically in the accompanying drawings.

IN THE DRAWINGS

Figure 2:
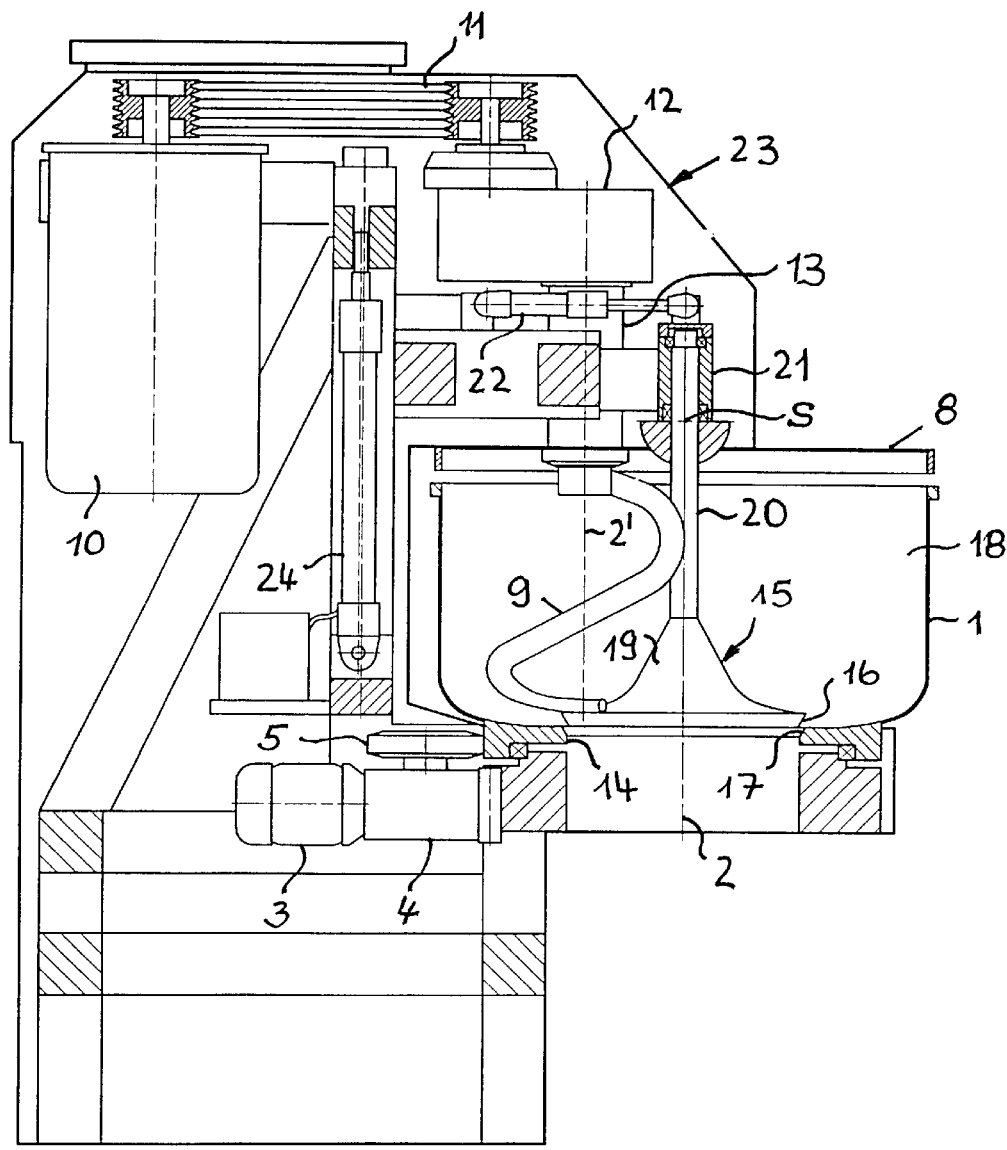
Figure 3:
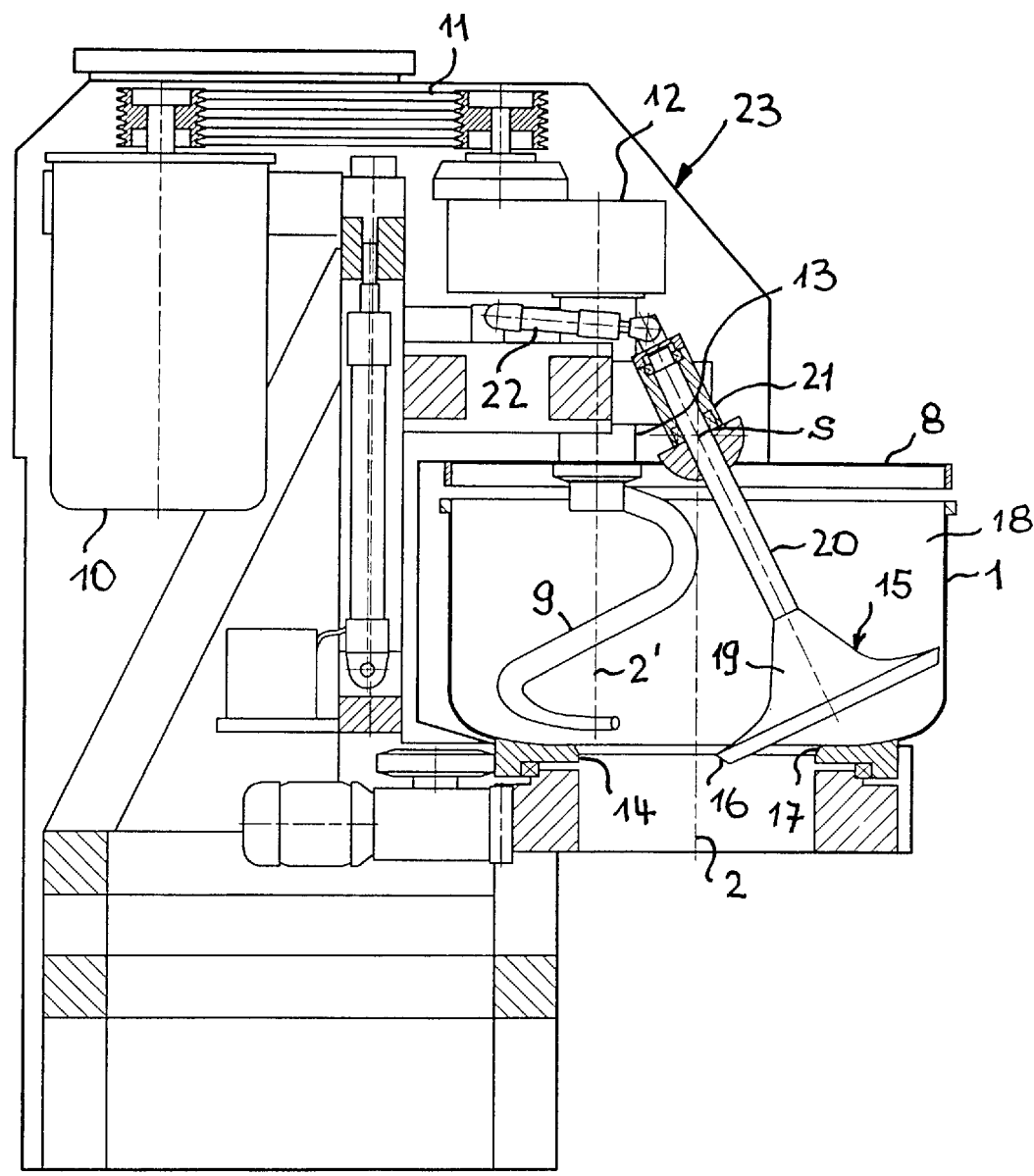
Figure 4:
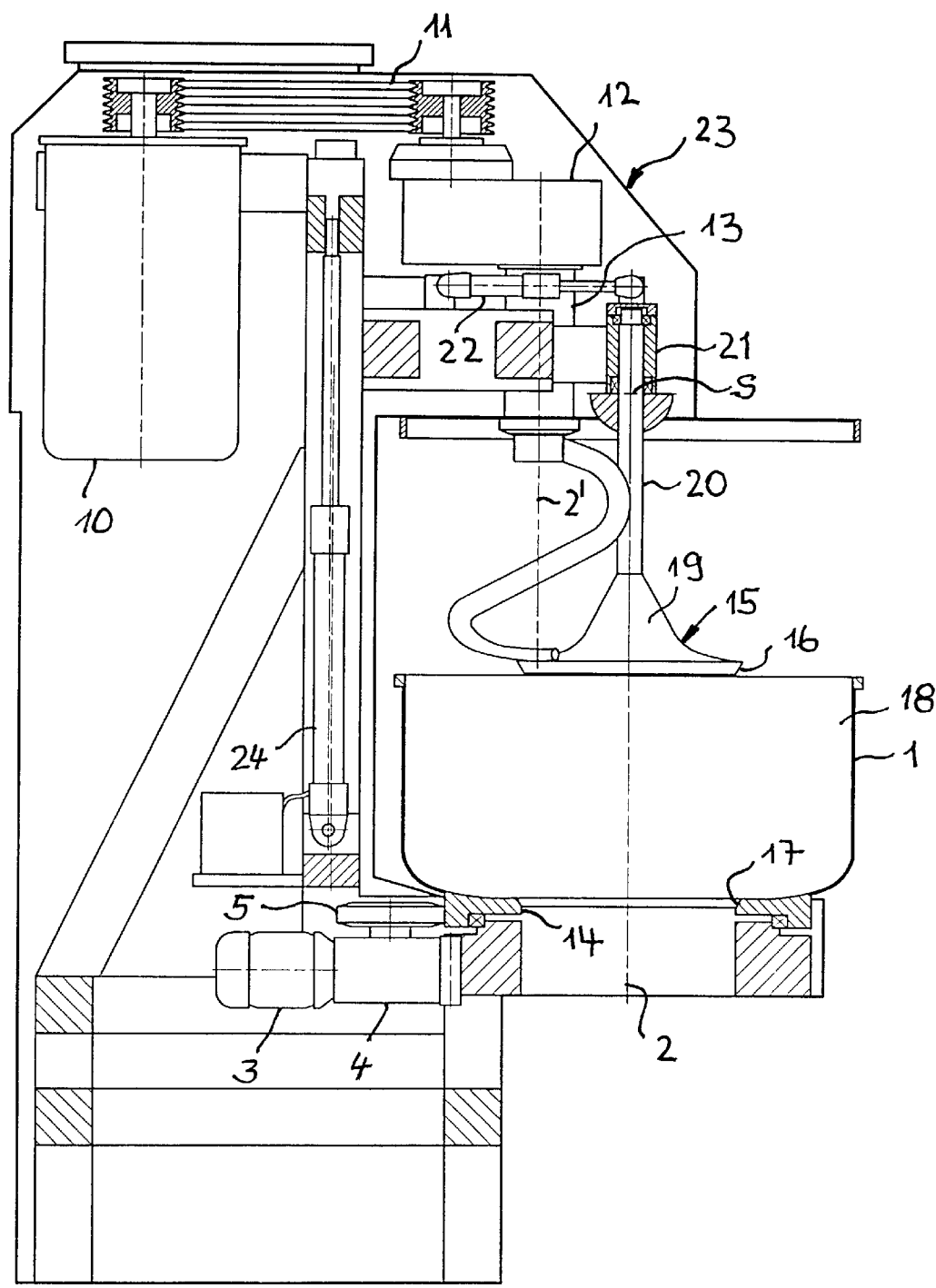

FIG. 1 shows a side view of the kneading and mixing machine of the invention, partially in section, with the closing body in the closed position, FIG. 2 shows a view similar to that of FIG. 1, with the closing body raised to an intermediate position, FIG. 3 shows a view similar to that of FIGS. 1 and 2 to illustrate the closing body in its discharging position, and FIG. 4 shows a view similar to FIGS. 1 to 3 to illustrate the machine with its parts in the service position.

DESCRIPTION OF THE PREFERRED EMBODIMENTS

The machine illustrated in the drawing, for kneading and mixing dough, foodstuffs, or the like, comprises a tub 1, which can be driven in rotation about a vertical axis 2 by means of a driving motor 3, a bevel gearing 4 and a friction wheel 5, and which is supported on a machine support 6 through a bearing 7. At least one tool 9 mounted for rotation about an axis 2c reaches into the tub 1, which can be closed at the top by a cover 8. As a rule, two tools 9, identical to or different from one another, are used, which are arranged side by side at a distance from one another on an arc around the tub axis 2. The tools 9 are driven by a motor 10, which, in the example shown, drives a shaft held in a casing 13 by a belt drive 11 and a reduction gearing 12.

In the bottom of the tub 1 there is a coaxial bottom opening 14, can be closed by a closing body 15. When in the closed state (FIG. 1), this closing body 15 is engaged by its downwardly tapering edge region 16 in a conical seat 17 in the tub bottom, in a sealing and simultaneously driving relationship. Accordingly, the closing body 15 rotates in the same sense with the tub without any separate driving means.

On its upper side, the closing body 15 is configured as a rotationally symmetrical guiding body 19, which reaches coaxially into the tub interior, and which in the area adjacent the outer edge 16 of the closing body 15 has a shape matched to the envelope contour of the working portion of the tools 9. In the embodiment shown, the tool 9 is of a spiral shape, but the tools can also be configured as kneading hooks or rings.

The top of the guiding body 19 is joined to a coaxial operating rod 20, which passes through a bearing 21, which can turn on a horizontal axis S and is in driving engagement at its upper end with an actuator 22, such as a hydraulic cylinder.

The closing body 15 is supported by the bearing 21 together with its actuator 22 on a head part 23 of the machine, which at the same time bears the tools 9 and the driving means 10, 11, 12, 13 for the latter. This head part 23 of the machine can be driven by a lifting jack 24 vertically upward and downward along vertical guides not shown, and specifically between a lower working position (FIG. 1), in which the closing body 15 is in the closed position, and in an upper service position wherein the closing body 15 is situated above the upper rim of the tub 1. In this service position the tools and the closing body are freely accessible for cleaning and servicing operations, since the tub cover 8 is lifted also by the raising of the machine head part 23.

With the parts in the operating state, represented in FIG. 1, the closing body 15 assumes its closed position. To discharge the tub contents after work on them is completed, the closing body 15 is first of all lifted from its closed position by raising the machine head part 23 to a mid-position (FIG. 2) wherein the closing body is located with its bottom just above the inner surface of the tub bottom. For the actual discharging process the closing body 15 is now turned to a discharge position (FIG. 3) wherein it frees the bottom opening 14 although it remains within the tub 1, while at the same time it assumes a guiding function in the discharging process, in which the tub performs a rotary motion opposite that of the previous working motion. This is brought about by a switch, not shown, which is operated no sooner than when the closing body 15 reaches the mid-position according to FIG. 2, and is operated no later than when the closing body 15 reaches its discharge position according to FIG. 3.

During the discharging of the contents of the tub, the closing body 15 can be swung to alternate between the mid-position of FIG. 2 and the discharging position of FIG. 3, in order to additionally promote the discharging process.

When the contents of the tub are discharged, they pass by gravity into a rolling tub, into a carrier to an additional working machine or directly into the inlet of a further processing machine, which is disposed next to the kneading and mixing machine.

What is claimed is:

1. A kneading and mixing machine for dough, foodstuffs or the like, with a tub (1) driven in rotation about a vertical axis of rotation (2), at least one rotatable tool (9) entering into the latter and driven in rotation about an axis parallel to the tub's axis of rotation (2), and a closing body (15) closing a coaxial bottom opening (14) in the tub bottom, which in order to discharge a finished tub content can be moved vertically by means of a lifting device (24) to a mid-position and then can be swung by means of an actuator (22) about a horizontal axis (20) to a discharge position, wherein the closing body (15) can be moved upward from its closing position to the mid-position and can then be swung within the tub (1) to the discharge position.

2. The machine of claim 1, wherein the actuator (22) of the closing body (15) is supported on a machine head part (23), which simultaneously bears the at least one tool (9) and its or their drive (10, 11, 12, 13) and is movable as a whole by means of a lifting drive (24) between a lower working position, in which the closing body (15) is in the closed position, and an upper service position, in which the closing body (15) is above the tub rim.

3. The machine of claim 1, wherein, when the closing body (15) is in the closed position, the latter enters with a downwards conically tapering edge region (16) into a tapered seat (17) in the tube bottom and is in sealing and driving engagement with the tub (1).

4. The machine of one of the claim 1, wherein the closing body (15) is configured on its upper side as a rotationally symmetrical guiding body (19) reaching coaxially into the tub chamber (18), and at the top coaxially joining a operating rod (20), passes through a bearing (21), which can swing about the horizontal axis (S) for the closing body (15) and is in working connection at its upper end with the swinging drive (22).

5. The machine of one of the claim 4, wherein the area of the guiding body (19) adjoining the outer edge (16) of the closing body (15) has a shape adapted to the envelope contour of the working portion of the tool (9) or tools.

6. The machine of one of the claim 1, wherein, after the mid-position is reached and no later than when the discharge position is reached by the closing body (15) a reversing switch reverses the drive for the tub (1).

7. The machine of one of the claim 1, wherein the closing body (15) can be set into alternating swinging movements by the actuator (22) during the discharge of the tub's contents.

* * * * *